(12) United States Patent
Bronnert

(10) Patent No.: US 7,368,139 B1
(45) Date of Patent: May 6, 2008

(54) ASEPTIC PROCESSING SYSTEM FOR FRUIT FILLING

(76) Inventor: Herve' X. Bronnert, 21495 Partridge Ct., Brookfield, WI (US) 53005

( * ) Notice: Subject to any disclaimer, the term of this patent is extended or adjusted under 35 U.S.C. 154(b) by 567 days.

(21) Appl. No.: 10/390,344

(22) Filed: Mar. 17, 2003

Related U.S. Application Data (60) Provisional application No. 60/364,467, filed on Mar. 15, 2002.

(51) Int. Cl.
*B08B 9/057* (2006.01)

(52) U.S. Cl. ............ 426/399; 426/521; 137/15.05; 137/15.07

(58) Field of Classification Search .......... 426/399, 426/520, 521; 99/355, 443 C, 483; 141/11, 141/82, 85, 89–92; 165/81–82, 94–95; 137/15.01, 137/15.04, 15.05, 15.07, 238, 240, 241; 285/134.1, 179, 181, 382, 382.1
See application file for complete search history.

(56) References Cited

U.S. PATENT DOCUMENTS

| | | | | |
|---|---|---|---|---|
| 3,000,028 A * | 9/1961 | Buie et al. | ............. | 15/104.062 |
| 3,146,477 A * | 9/1964 | Bergman et al. | ....... | 15/104.062 |
| 3,283,354 A * | 11/1966 | Simmons | ............... | 15/104.062 |
| 3,779,270 A * | 12/1973 | Davis | ......................... | 137/268 |
| 3,819,513 A * | 6/1974 | Ishii et al. | .................. | 210/636 |
| 3,883,431 A * | 5/1975 | Ishii et al. | ................... | 210/134 |
| 4,044,418 A * | 8/1977 | Ishii et al. | ............. | 15/104.062 |
| 4,361,485 A * | 11/1982 | Boonstra | .................... | 210/636 |
| 4,457,037 A * | 7/1984 | Rylander | .............. | 15/104.062 |
| 4,516,596 A * | 5/1985 | Sugisawa et al. | ........... | 137/240 |
| 4,607,410 A * | 8/1986 | Bersch | ........................ | 15/3.51 |
| 4,709,719 A * | 12/1987 | Littleton et al. | ........... | 137/268 |
| 4,753,261 A * | 6/1988 | Zagustin et al. | .............. | 137/13 |
| 4,850,270 A * | 7/1989 | Bronnert | ...................... | 99/355 |
| 5,050,670 A * | 9/1991 | Bronnert | .................... | 165/163 |
| 5,052,474 A * | 10/1991 | Bronnert | ...................... | 165/67 |
| 5,072,476 A * | 12/1991 | Bersch | ......................... | 15/3.51 |
| 5,722,317 A * | 3/1998 | Ghiron et al. | ................. | 99/452 |
| 5,890,531 A * | 4/1999 | Gairns et al. | ................. | 165/95 |
| 6,158,481 A * | 12/2000 | Kiholm | ......................... | 141/1 |
| 6,179,343 B1 * | 1/2001 | Byrnes | ....................... | 285/184 |
| 6,446,659 B2 * | 9/2002 | Schroeder | ................... | 137/240 |
| 6,457,513 B1 * | 10/2002 | Walker | ......................... | 165/66 |
| 6,834,679 B2 * | 12/2004 | Briggs | ..................... | 137/899.4 |
| 6,953,598 B2 * | 10/2005 | Cotten et al. | ............... | 426/576 |

* cited by examiner

*Primary Examiner*—Drew Becker
(74) *Attorney, Agent, or Firm*—Foley & Lardner LLP (57) ABSTRACT

An apparatus for aseptic processing of a viscous food product includes a product tank configured to hold the viscous food product. A first pump is configured to pump the viscous food product from the product tank through a heat exchanger at a given rate. A cleaning station including a cleaning pump configured to pump a flushing fluid through the product tank. A second pump is configured to pump a flushing fluid through the heat exchanger at the same rate as the first pump, while the cleaning pump is pumping the flushing fluid through the product tank and first pump.

13 Claims, 5 Drawing Sheets

ASEPTIC PROCESSING SYSTEM FOR FRUIT FILLING

CROSS-REFERENCE TO RELATED PATENT APPLICATIONS

This application claims the benefit of U.S. Provisional Application No. 60/364,467, filed Mar. 15, 2002, entitled "Aseptic Processing System for Fruit Filling" and is incorporated by reference herein.

BACKGROUND OF THE INVENTION

The present invention relates generally to the field of aseptic processing for food items; and more particularly, to a water/product separation system for viscous aseptic food processing.

Commercial food products that include both solid particulate and liquids that are packaged and sold through retail outlets must be processed in an aseptic environment. Products such as fruit filling for yoghurt is first mixed in a tank and conveyed through a heat exchanger to sterilize the product prior to packaging. When the type of product to be processed is changed, the system must first be cleaned or flushed to ensure that the different products do not mix. A system could be in non-production for four to five hours as the tanks, pumps and heat exchanger is cleaned and sanitized prior to introducing a new food product.

Prior art heat exchangers typically weld each linear length of the inner tubing to the outer jacket at both ends before the inner tubing is reversed 180 degrees. The welding of the inner tubing at both ends places stress on the welds when the inner tubing expands due to introduction of heat, resulting in failure of the weld. This can result in leaking of the heat transfer fluid as well as contamination of the product carried in the inner tubing.

SUMMARY OF THE INVENTION

One embodiment of the invention relates to a heat exchanger having an inner tube and an outer jacket, the inner tube and outer jacket include at least one 180 degree turn. One way of forming the inner tube is to cut two standard ninety degree components into four components, three of which are the same size, and one of which is smaller than the other three.

In another embodiment, two formulation tanks are used in parallel to introduce the fruit filling into the system to eliminate down time of the aseptic processing.

In still a further embodiment, the invention relates to a method for cleaning the heat exchanger portion of the aseptic processing system independent of the product vacuum balance tank.

In yet another embodiment, the cleaning system includes a ball injection and recovery system to isolate the food product from the cleaning fluid.

In another embodiment, the product pump includes a bottom floor having an exit valve at a low point on the bottom floor to clean the product pump.

In still a further embodiment, three pumps are used in parallel to clean the entire aseptic processing system including a product tank; product pump; heat exchanger.

In yet another embodiment, an aseptic processing system includes a closed loop for injecting a ball into the system for separating food product from water and recovering the ball for subsequent use.

DETAILED DESCRIPTION OF THE PREFERRED EMBODIMENTS

Figure 1:
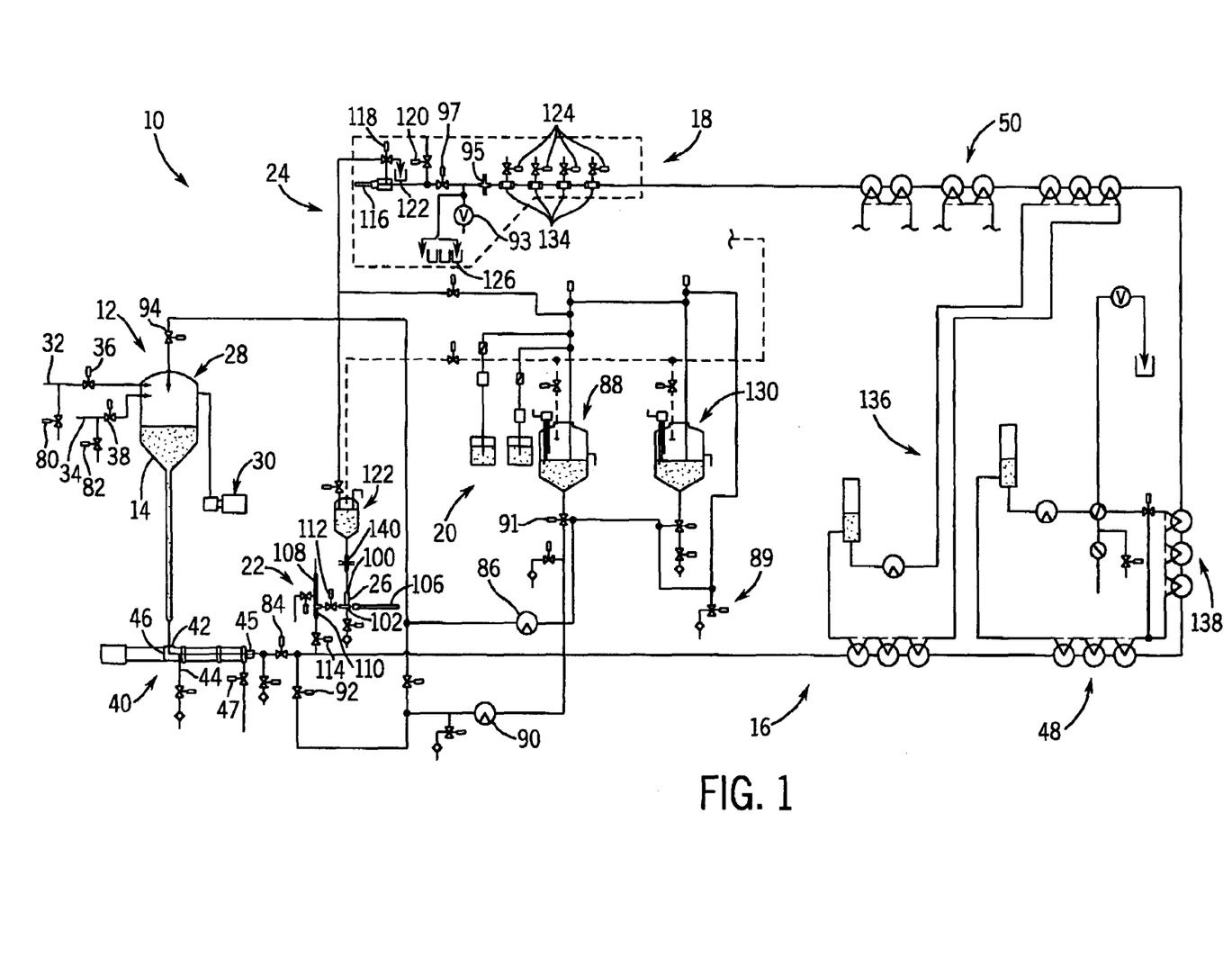
FIG. 1 is a schematic illustration of the aseptic processing system.

Referring to FIG. 1, an aseptic processing system 10 includes a liquid based food product loading assembly 12 that introduces a food product 14 to be processed into the heat treating system 16. The food product 14 may include a liquid portion and a solid portion such as a fruit filling. The food product is heated to a required temperature and subsequently cooled in the heat treating system 16 before being conveyed to a filling station 18 for packaging. A flushing or cleaning assembly 20 introduces water in acid to flush and keep sterility in the system 10. A ball injection assembly 22 is utilized to introduce and balls 26 into the heat treating system to separate the food product from the flushing fluids introduced into the system. A ball recovery assembly 24 recovers and washes the balls in a closed loop cycle to be reintroduced in subsequent operation.

The loading assembly 12 includes two separate formulation tanks (not shown) for preparing and mixing the food product. The water based portion of the food product may be mixed in a separate tank with high agitation. This portion of the food product could include such ingredients as hot water, starch, pectin, sugar, color and flavoring. This liquid based portion of the food product is then mixed with a solid food portion such as semi frozen fruit sections that will be mixed with the liquid based portion at a lower agitation so as not to damage the solid food portion such as fruit. The resultant food product is then stored in one of the two formulation tanks for introduction into the product tank 28. Alternatively, the food product could be prepared in the formulation tanks directly.

The food product is transferred to the product tank 28 by means of a vacuum generated by a vacuum pump 30 in order to avoid the use of pump rotor or propeller that may damage the fruit portions for example. A separate inlet 32, 34 attached each formulation tank to the product tank 28. Valves 36, 38 control the transfer of the food product from the two formulation tanks respectively to the product tank 28. In this manner only food product from one mixing tank is transferred to the product tank at a time. This permits the other tank to be cleaned and a new batch to be prepared while the first tank is being emptied.

When the food product that was initially in the first formulation tank has been emptied into the product tank 28, the inlet valve 36 is shut and the second inlet valve 38 is opened to permit the food product in the second formulation tank to be transferred into the product tank. The first tank may then be cleaned by opening a valve 80 that can be used to introduce water to flush the first formulation tank inlet line, prior to preparing another batch of food product. Second inlet line 34 also includes a cleaning valve 82 for the same purpose.

Figure 2:
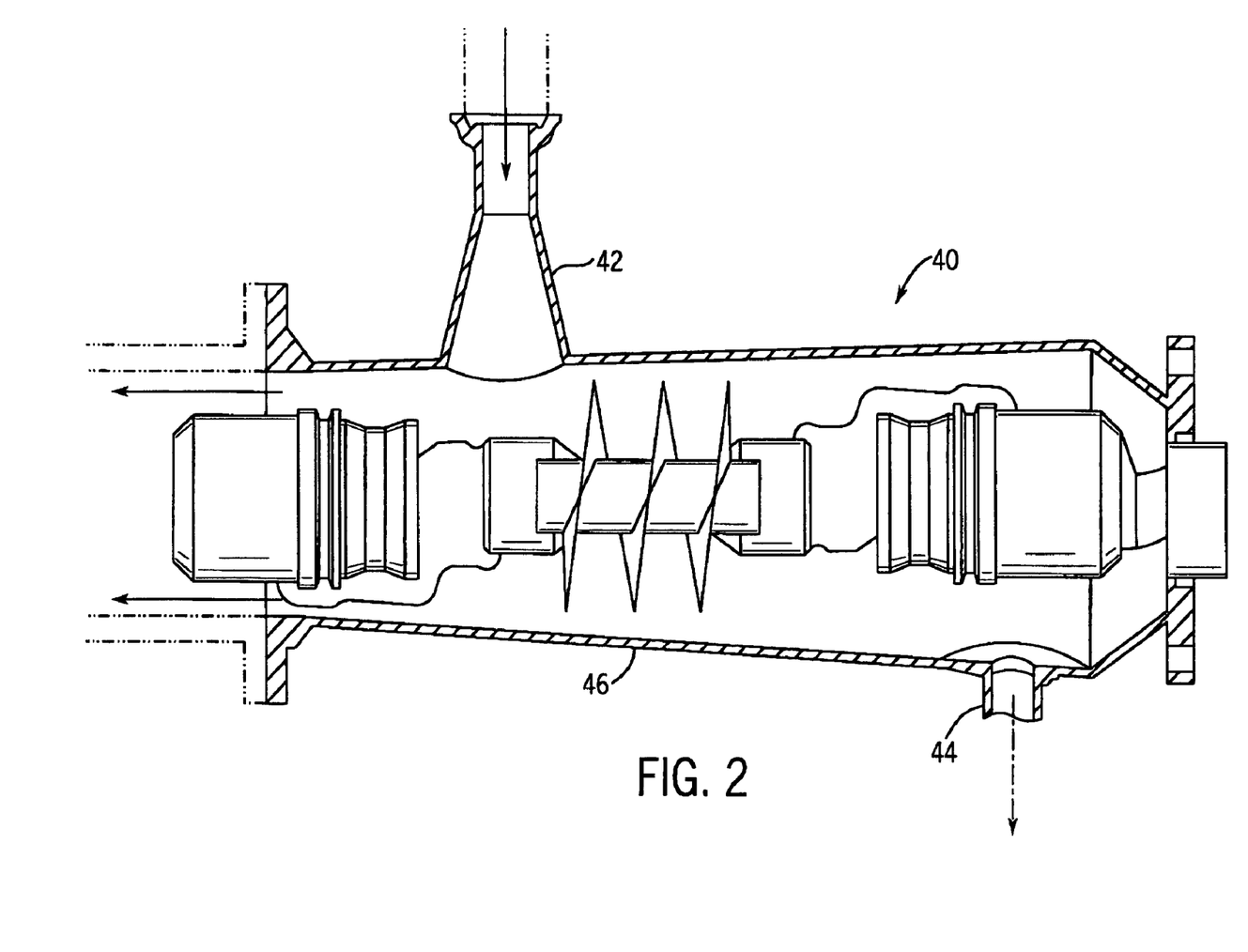
FIG. 2 is a cross-sectional view of a pump.

Once the food product is in the product tank 28 it is fed with the assistance of gravity into the heat treating system 16 by pump 40. In FIG. 2 the inlet casing portion of the progressive pump is illustrated. The product tank 28 is located directly above pump 40 so that gravity may aid in the presentation of the food product to the pump 40. Referring to FIG. 2, pump 40 includes an inlet 42 connected to the product tank 28 and a first product outlet 45 for discharging the food product into the heat treating system 16. A drain 44 is located on the bottom portion of the pump 40 for cleaning as will be described below. The inlet casing 46 of the pump 40 is slanted downward toward the drain 44 to aid in the cleaning process. An inlet valve 47 is located proximate outlet 45 to facilitate cleaning of inlet valve 47 with water and/or cleaning fluid during the cleaning process. Pump 40 is the only mechanical pump that contacts the food product once it is initially mixed and stored in the formulation tanks. Pump 40 pumps the food product into the heat treating system at a constant rate to ensure that all of the food product is treated in the same manner. Typically the food product is pumped at a rate of 7-15 gallons per minute. However, other rates may be employed based on the application. The food product enters the heat transfer assembly through pump outlet 45.

Figure 3:
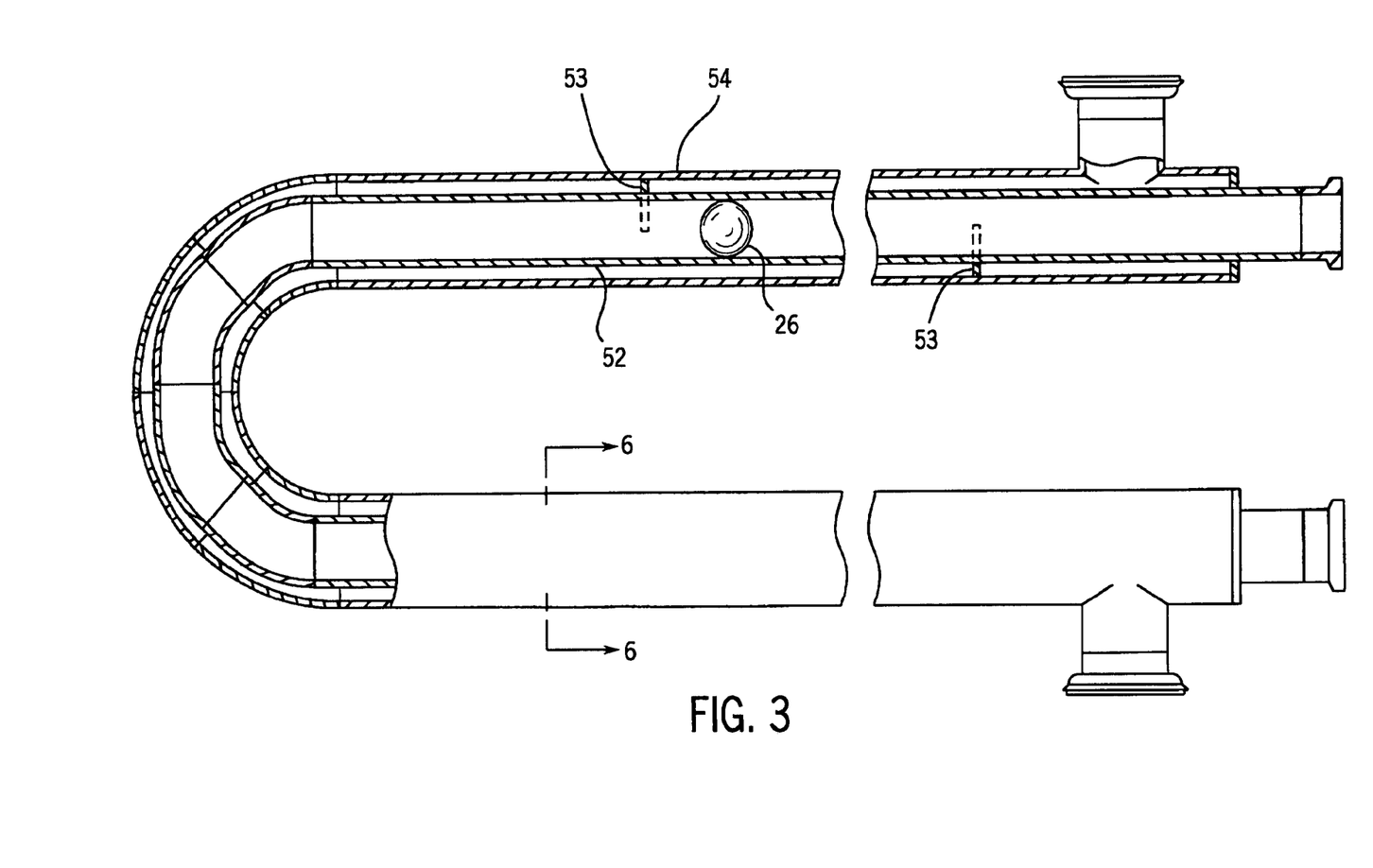
FIG. 3 is a plan view of one section of a heat exchanger inner tube and jacket.

Once the food product is introduced into the heat treating system 16 it is conveyed through heat transfer heating units 48 to first heat the food product and then refrigeration cooling units 50 cool the food product prior to packaging. Referring to FIG. 3 the heat transfer heating units 48 and cooling units 50 include an inner tubing 52 through which the food product travels and an outer jacket 54 completely surrounding the inner tubing 52. A heat transfer medium is located between the jacket 54 and inner tubing 52. The inner tubing 52 extends for distances such as 20 feet or more and then turns 180 degrees and extends back for the same distance. A heat transfer unit may have multiple turns in order to minimize space. Prior art devices typically weld the inner tubing to the outer jacket prior to the 180 turns so that only the inner tubing turns 180 degrees. This required the length of inner tubing to be welded to the outer jacket at both ends of the linear run. Since the inner tubing over say a twenty foot span is likely to expand longitudinally, the welds often fail after a short period resulting in leaks of the heat transfer fluid through the outer tubing or worse a leak of the heat transfer fluid into the inner tubing thereby contaminating the food product. Of course the length of the run of the inner tubing will vary based on the application and space available.

Figure 4:
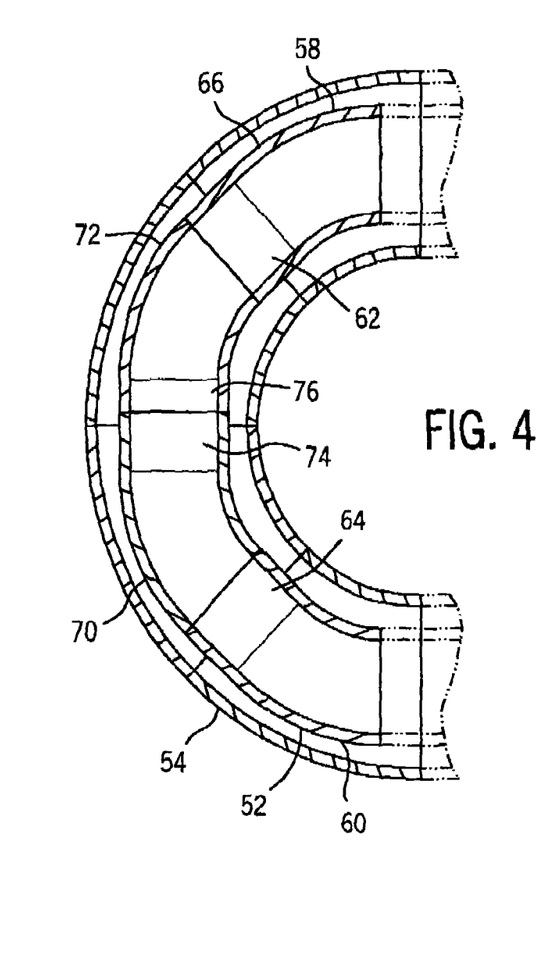
FIG. 4 is a cross sectional view of the 180 degree turn of the heat exchanger.
Figure 5:
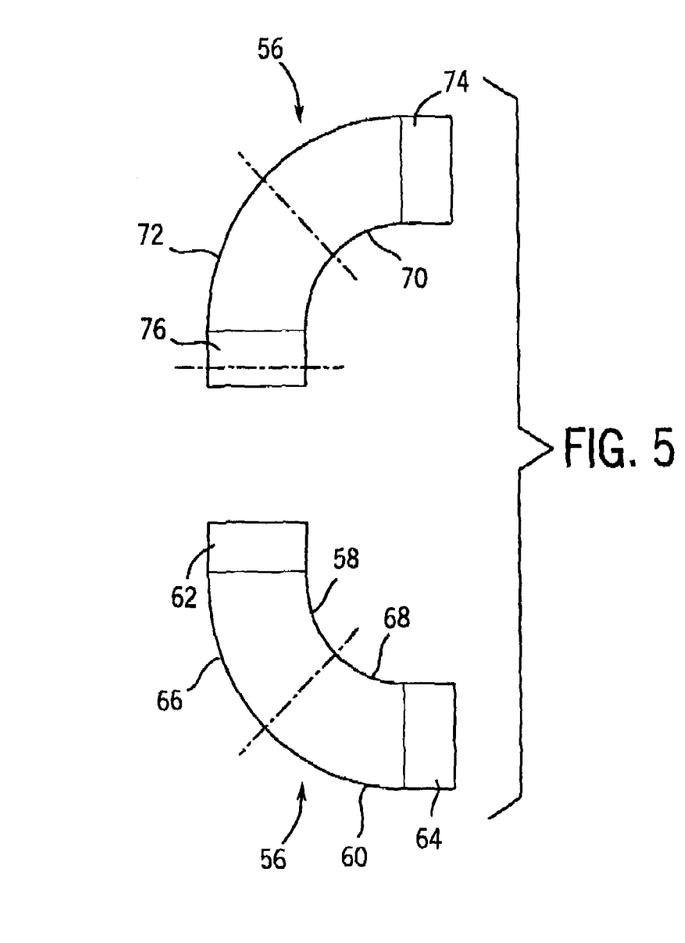
FIG. 5 is a plan view of standard two ninety degree two inch elbow components.
Figure 6:
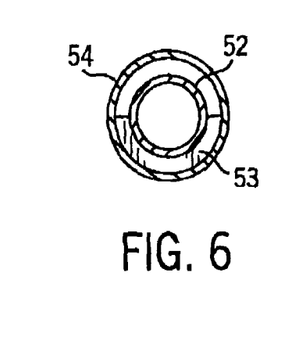
FIG. 6 is a cross sectional view of the inner tube and jacket of taken generally along line 6-6 of FIG. 3.
Figure 7:
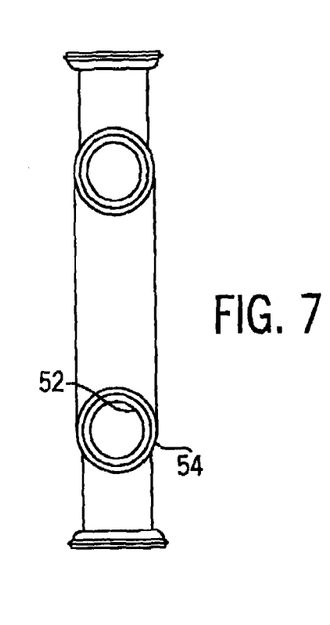
FIG. 7 is an end view of two linear segments of the heat exchanger of FIG. 3.
Figure 8:
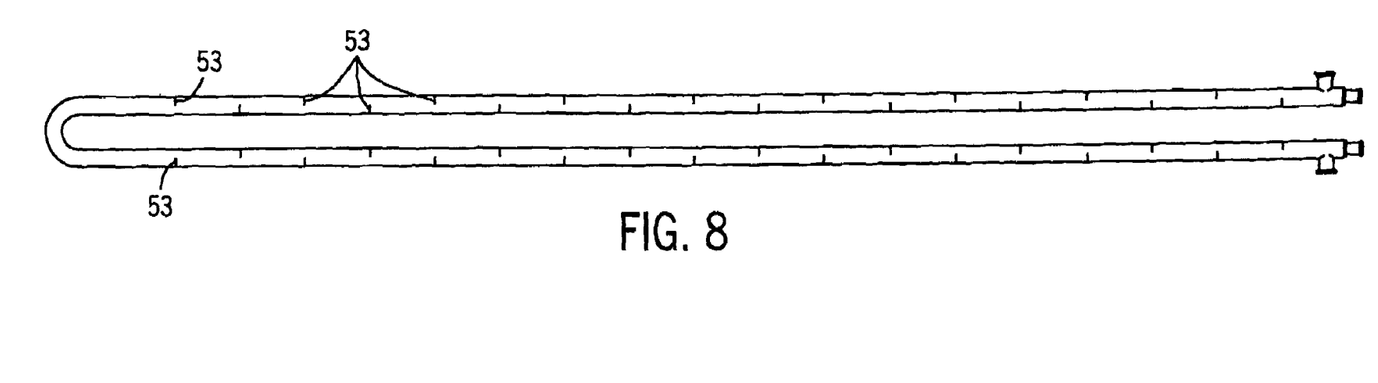
FIG. 8 is a plan view of the section of heat exchanger of FIG. 3 showing a its full length.

As illustrated in FIG. 3 the inner tubing 52 is secured to the outer jacket 54 only at one end of the linear run thereby allowing for expansion of the inner tubing without the failure of the system. A number of baffles 53 are located in jacket 54 to support the inner tubing 52 keep the inner tubing 52 centered within the jacket 54. This arrangement is accomplished by extending the outer jacket around the inner tubing about the 180 degree turn. In the preferred embodiment the inner tubing is standard two inch tubing having an inner diameter of 1.870 inches. The outer jacket is a standard three inch tubing. The 180 degree turn of the inner tubing is formed from two standard ninety degree two inch members 56 as illustrated in FIGS. 4 and 5. A standard ninety degree elbow includes a linear portion extending $1\frac{1}{16}$ inch.

The linear rise from the base of one side of the elbow to the center line of the other side of the elbow is $4\frac{1}{16}$ inch. A first ninety degree 2 inch member is cut across a center line with a 45 degree angle forming two identical portions 58, 60. Each portion having a first linear portion 62, 64 and a curved portion 66, 68 respectively. The second standard ninety degree 2 inch member is also cut across a center line with a 45 degree angle to form the third and fourth portions 70, 72. Each portion 70, 72 includes a linear portion 74, 76 respectively. However the fourth portion 72 is further sized by removing 0.6276 inch from the linear portion. As illustrated in FIG. 4, portions 58, 60, 70 and 72 are welded together to form a 180 degree turn in the inner tubing that will fit within a standard three inch turn.

The portions 58, 60, 70 and 72 are welded together in such a manner so the inner surface is flush with little or no welding flash. This will permit the balls 26 to travel through the 180 degree turn with little difficulty as will be described below.

Once the food product travels through the heat treating system it is presented to the packaging or filling station 18 to be filled into storage containers or final product container for shipping.

When aseptic system 10 is to be used it must first be sterilized to ensure an aseptic environment. To accomplish the initial sterilization, a sterilizing fluid is introduced into the system from chemical fluid tank 88, and pumped with water pump 86 through the heat treating system 16, and filling station 18. The water fluid is initially flushed out of the system through a valve 89 for a period of time. Then in order to heat the entire system, the loop is closed so that the sterilizing fluid is through the heat exchanger and filling station. This is accomplished by closing valve 89 and directing the water through a valve 91 and back to pump 86.

Similarly, cleaning fluid may be pumped through product tank 28 and product pump 40. Pump 86 pumps cleaning fluid into product tank 28 through valve 94 and through pump 40 exiting through drain 44. Once the product pump 40 has been cleaned, valve 94 is closed and valve 36 or valve 38 is opened to allow food product in the formulation tanks to be introduced into the product tank 28 by vacuum pump 30.

When the food product in product tank 28 is ready to be introduced by pump 40, separation valve 84 is opened and shortly after a front ball 26 is introduced into the line by an actuated cylinder 108.

In order to minimize contamination of the food product to be processed with the sterilizing fluid already in the system, a first or front ball 26 is introduced into the system between the sterilizing fluid already in the system and the food product being already introduced into the system. The front ball 26 acts as a barrier between the sterilizing fluid being pushed through and out of the system and the food product in a manner to minimize the amount of food product proximate the ball that must be discarded due to mixing with the cleaning fluid and/or water. At this point the sterile fluid is no longer circulated in a closed loop, rather all of the cleaning fluid remaining in the system is flushed out through a valve 93 located down stream of the filling station 18 to a drain. The content of the fluid in tank 88 will differ based upon the stage of preparation. For example, the fluid in tank 88 may be a caustic water fluid for cleaning or acidic water for sterilization.

Once the front ball 26 passes the filling station 18, a photoelectric sensor 95 or other type of sensor know in the art detects the front ball 26 and valve 93 is closed and the filling valves 124 are opened allowing the food product to be packaged. Front ball 26 is held in within a ball separation area located within a pipe having an inner diameter larger than the inner diameter of the inner pipe in the heat exchanger and filling station. This larger diameter allows fluid to flow around the front ball 26. Front ball 26 is prevented from moving through the separation area by a valve 97. Front ball 26 is held in the separation area for as long as food product is being processed in the system. In a preferred embodiment, as discussed above, the alternate use of two formulation tanks allows for continuous processing of the same food product in the system. The continuous processing of the same food product is accomplished by introducing alternatively from the two formulation tanks the same type of food product into the product tank 28.

Once, the operator wishes to change the type of product that will be processed through system 10, the food product in the system must be completely processed and the system must be cleaned prior to introducing and processing a different food product. To ensure that the two different products are not mixed and to ensure an aseptic environment for the different food product, product tank 28, pump 40, heat treating system 16 and packaging station 18 must be cleaned. As described in greater detail herein cleaning pump 86 works in parallel with a secondary pump 90, and ball injection assembly 22 to both process the first food product remaining within system 10 as well as to clean the system.

Referring to FIG. 1, when a different food product is to be introduced into the system separation valve 84 is shut to isolate or separate the loading system 12 from the heat treating system 16. A second pump 90, pumping at the same rate as pump 40, pumps cleaning fluid from tank 88 into the system. A valve 92 permits the fluid to enter and flush the first food product from the heat treating system 16. Once valve 92 is opened a second or rear ball 26 is introduced into the inner tubing of the heat treating system to separate the first food product remaining in the system from the cleaning or flushing fluid being introduced. This ball 26 that follows or is at the rear of the first food product will be referred to as the rear ball in contrast to the front ball that is in front of the food product separating it from the cleaning fluid already in the system.

The balls 26 may be formed from EPDM having a high heat resistance. In a preferred embodiment the balls 26 have a diameter of 1.850 inches to permit them to travel through the inner tubing 52 having an inner diameter of 1.870 inches. This difference is size provides a 0.01 inch clearance between the ball and inner tubing. However, based on an inner diameter of 1.870 inches the diameter of the balls 26 could be between 1.845 and 1.865 inches for a clearance of between 0.0025 inches and 0.0125 inches. The balls 26 allow for a certain amount of deformation to enable passage through the inner tube 52 that may have varied due to welding or contraction. The ability of the balls 26 to rotate also enable the passage of the balls 26 through the inner tube 52 including the turns within the inner tube structure. In alternative embodiments, the particular size of the tubing and the particular size of the ball may vary.

Cleaning fluid is then pumped by pump 90 through the system behind the rear ball 26 at the same rate that the pump 40 was pumping the food product through the heat treating system. The same speed allows the food product remaining in the system to be properly treated by being propelled through the system at the same rate as when it was pumped by pump 40. The heat treatment is based in part on the speed of the food product traveling through the heating and cooling units.

Once the rear ball 26 reaches the filling station 18 it may be detected with a mechanical and/or electrical sensor. Alternatively, a flow meter may be used to measure the amount of cleaning fluid that is pumped into the system after the rear ball has been introduced into the system. Once the amount of cleaning fluid required to move the rear ball to the filling station has been pumped, the filling valves 124 are closed and a valve 93 is opened to allow the cleaning fluid to drain from the system. In order to force the rear ball out of the filling station and to help remove any of the first food product from the inner tubing 52, pump 86 pumps cleaning fluid into the system through a bypass around pump 90 at a higher flow rate then that of pump 90 for approximately 7 seconds or a time sufficient to force the rear ball away from the tees 134 that are located proximate filling valves 124. The diameter of the inner tubing proximate valve 97 is 2½ inches to promote free movement of the balls 26. Cleaning fluid is allowed to flow around the balls until valve 97 is opened allowing the balls 26 to be captured in the holding station 116.

Prior to pump 86 pumping cleaning fluid at a higher flow rate through the system, pump 90 may pump cleaning fluid for a period of time such as five minutes to help clean the pipes of the first food product. Once pump 86 is activated through the bypass of pump 90, valve 93 is closed and valve 97 is opened to allow the front and rear balls 26 to be captured in a holding station 116. During this period, the cleaning fluid is directed through valve 118 and to allowed to drain in bucket or drain 126. After a 7-10 seconds valve 97 is closed and valve 93 is again opened permitting the cleaning fluid to drain. A fresh water valve 120 is now opened and city water is allowed to flush the ball holding area through valve 118 to drain 126. Fresh water valve 120 is then closed, and valve 118 is switched to permit the balls 26 to be ejected by holding station 116 to ball holding tank 122. After the balls pass through tank 122, and all detector 140 they fall into storing magazine 100 for subsequent processing.

Simultaneously, with the processing of cleaning fluid through the heat treating system 16 and filling station 18 as described above, cleaning pump 86 pumps the cleaning or flushing fluid into product tank 28 through valve 94 located on top of the product tank 28. Valves 36 and 38 are closed during this process to isolate the formulation tanks. The fluid then flushes the remaining first food product from the product tank 28 as well as from the pump 40 and connecting line between pump 40 and the separation valve 84. The fluid exits through outlet valve 44 to clean the pump 40 inlet and through the pump 40 and valve 96. The fluid is pumped through the product tank 28 and through pump 40 at the rate of pump 40. In a preferred embodiment, cleaning pump 86 pumps the cleaning fluid through product tank 28 at 70 gallons per minute. This is up to 10 times faster then the flow rate of pumps 40 and 90. This increased flow rate of pump 86 allows for a quick cleaning of product tank 28, so that a new food product may be introduced. Since pump 86 is pumping at a higher rate than pump 40 the excess fluid is drained through drain 44. Since, pumps 86 and 90 are running in parallel, the speed in which cleaning takes place is increased. In order to thoroughly clean pump 40 during this stage, it is also desirable to run pump 40.

Once the product tank 28 and pump 40 are cleaned one of the valves 36, 38 introduces the second type of food product into the product tank 28. Once the second food product fills the pump and reaches valve 96, separation valve 84 is opened and a second front ball 26 is injected into the inner tubing of the heat treating system 16 to separate the cleaning or flushing fluid from the second food product.

The increased speed of pump 86 permits the cleaning of the product tank 28 and pump 40 in a timely fashion. In a preferred embodiment, this cleaning operation requires approximately 10-30 minutes. This compares to approximately 4 hours for cleaning a typical prior art aseptic processing system.

The ball injection and recovery assembly includes a complete closed loop in which the balls are injected into the system, cleaned in the recovery assembly and returned to the injection assembly without leaving the aseptic processing system 10. In this manner the balls are maintained within the system at all times.

Turning now to the ball injection assembly 22 magazine 100 has a clear window to show how many balls 26 are in the magazine and ready for processing. When required a ball 26 is released from the magazine by a pneumatic cylinder or any other control mechanism 102 that allows a ball 26 to drop into the injection tube 104. The injection tube has a diameter of 2½ inch to enable the balls to move freely. Driven cylinders 106, 108 forces the ball into the drop tube 110. Valves 112 and 114 permit the ball to travel within the drop tube 110 without food product or flushing fluid from backing up into and entering the ball injection system.

The flushing and cleaning fluid is stored in tanks 88 and 130. The two tanks allow for introduction of both water and a cleaning fluid like caustic water.

The foregoing system has a number of advantages. The location of the product tank above the pump 40 permits easy entry of the food product into the pump. The pump 40 progressive cavity inlet allow it to be cleaned without disconnecting the pump from the system. This is facilitated in part by the pitched base 46 toward drain 44. The combination of the product tank 28 and pump inlet 42 permits the product tank 28 and pump 40 to be flushed or cleaned as one unit.

The product tank 28 including two (2) inlets 32, 34 allow savings in time while the batches of product are being prepared. The complete closed circuit of the ball system minimizes contamination due to external factors. The ball injection and recovery assemblies works with greater ease since the diameter of the pipes in these assemblies is greater than the diameter of the inner tubing in the heat treating system 16.

Special ball separation tees 134 prevent the balls from entering the filling valves 124.

The ball infrared monochromatic detection 98 using fiber optic and special adapter. The filling valves 124 can be opened a predetermined time after the second ball passes the detector. This permits the second food product to be packaged.

Another feature is a regeneration loop 136 that can be employed or bypassed by the food product as required. Similarly, another heating section 138 can also be employed or bypassed to expand the heating loop to the holder making a single long heating loop Use of the balls 26 permits flushing of the system with water This system 10 permits introduction of a food product after the system has been flushed with minimal product loss. In prior art systems the product loss could be over 1000 pounds of product that has mixed with the flushing fluid or water. The ball injection and recovery system allows the food product to follow the water fluid with minimal loss of product, since the balls 26 substantially eliminate mixing of the food product and water. This is relevant not only when a different food product is being processed, but during system startup when the system is water flooded prior to product introduction.

The invention includes both a method and supporting apparatus for septic processing of viscous food products, but includes any viscous fluids. The invention is not limited to the combination of all features described but rather includes each feature separately or in combination with any or all of the other features described.

What is claimed is:

1. A method of separating two fluid products in an aseptic viscous food processing system comprising:
   a) pumping a first fluid product through a heat exchanger tube having an inner diameter and a plurality of 180 degree turns;
   b) injecting a first ball being formed from EPDM and having a round spherical shape with a constant diameter into the tube in a first region, wherein the diameter of the first ball is less than the inner diameter of the tube;
   c) pumping an amount of a different fluid through the tube behind the first ball;
   the difference between the diameter of the first ball and the inner diameter of the tube being sufficient to separate the first fluid and different fluid as well as permit free rotation of the first ball in all directions as the first ball travels through the tube, the first ball being formed of a material permitting sufficient deformation to allow the first ball to pass any variation in the inner diameter of the tube,
   d) placing a second ball being formed from EPDM and having a round spherical shape with a constant diameter into the tube behind the different fluid, wherein the diameter of the second ball is less than the inner diameter of the tube, the difference between the diameter of the second ball and the inner diameter of the tube being sufficient to permit free rotation of the second ball in all directions as the second ball travels through the tube, the second ball being formed of a material permitting sufficient deformation to allow the second ball to pass any variation in the inner diameter of the tube, and
   e) automatically returning the balls to the first region for subsequent use.

2. The method of claim 1, wherein the diameter of each ball is between 0.005 and 0.025 inches less than the inner diameter of the tube of the heat exchanger.

3. The method of claim 2, wherein the balls are formed of a heat resistance material.

4. The method of claim 1, further repeating at least some of the steps a)-e).

5. The method of claim 1, wherein the first fluid is a viscous food product.

6. The method of claim 5 wherein the second fluid is a flushing fluid.

7. The method of claim 1, further including providing the first fluid from a product tank and pumping the first fluid from the product tank to the heat exchanger.

8. The method of claim 7, further including cleaning the product tank during the pumping of the different fluid.

9. The method of claim 8, wherein cleaning the product tank includes pumping a cleaning fluid through the product tank.

10. The method of claim 1, wherein injecting a ball into the tube in a first region includes injecting a ball into the tube with a ball injection assembly.

11. The method of claim 1, wherein the heat exchanger tube includes an inner tube through which the fluid products are conveyed and an outer jacket completely surrounding the inner tube forming a path for a heat transfer medium, the inner tube and outer jacket having at least two linear sections being joined together by a 180 degree connection, the inner tube being connected to the jacket at only one end of each linear section opposite the 180 degree connection, the inner tube being freely located within the outer jacket within the 180 degree connection, allowing the 180 degree turn of the inner tube to float within the 180 degree turn of the outer jacket to allow for expansion of the inner tube relative to the jacket along the liner sections.

12. The method of claim 11 wherein the 180 degree connection of the inner tube is formed from a first and second standard 90 degree elbow, the first elbow being cut into a first cut piece and a second identical cut piece the second elbow being cut into a third cut piece and fourth cut piece, removing a linear portion of the fourth cut piece, securing one of the first, second and third cut piece to the fourth cut piece, securing the other two of the first, second, and third cut piece to one another and to the fourth cut piece to form an inner diameter of constant diameter and wherein the distance between an outer portion of the inner tubing and an inner diameter of the outer jacket varies along the 180 degree connection.

13. The method of claim 12, wherein the outer jacket is also formed from two standard 90 degree elbows that are larger than standard 90 degree elbows used for the inner tube.

* * * * *